United States Patent
Okada et al.

(10) Patent No.: US 11,960,626 B2
(45) Date of Patent: Apr. 16, 2024

(54) GENERALIZATION HIERARCHY SET GENERATION APPARATUS, GENERALIZATION HIERARCHY SET GENERATION METHOD, AND PROGRAM

(71) Applicant: NIPPON TELEGRAPH AND TELEPHONE CORPORATION, Tokyo (JP)

(72) Inventors: Rina Okada, Musashino (JP); Satoshi Hasegawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 357 days.

(21) Appl. No.: 17/428,648

(22) PCT Filed: Feb. 27, 2020

(86) PCT No.: PCT/JP2020/007983
§ 371 (c)(1),
(2) Date: Aug. 5, 2021

(87) PCT Pub. No.: WO2020/179606
PCT Pub. Date: Sep. 10, 2020

(65) Prior Publication Data
US 2022/0114282 A1    Apr. 14, 2022

(30) Foreign Application Priority Data
Mar. 5, 2019 (JP) .................................. 2019-039313

(51) Int. Cl.
*G06F 21/00* (2013.01)
*G06F 21/62* (2013.01)
*G06F 40/103* (2020.01)

(52) U.S. Cl.
CPC ........ *G06F 21/6254* (2013.01); *G06F 40/103* (2020.01)

(58) Field of Classification Search
CPC . G06F 21/6254; G06F 40/103; G06F 21/6245
See application file for complete search history.

(56) References Cited

U.S. PATENT DOCUMENTS 11,068,619 B2 * 7/2021 Canard ................... G06F 17/18
2002/0169793 A1 * 11/2002 Sweeney .............. G06Q 20/383
715/255

(Continued)

FOREIGN PATENT DOCUMENTS

JP    2018-010453 A    1/2018

OTHER PUBLICATIONS

Nelson, Gregory S. "Practical implications of sharing data: a primer on data privacy, anonymization, and de-identification." SAS global forum proceedings. 2015. (Year: 2015).*

(Continued)

*Primary Examiner* — Ka Shan Choy
(74) *Attorney, Agent, or Firm* — XSENSUS LLP

(57) ABSTRACT

A technology that generates a set of generalization hierarchies that reduces information loss when generalizing any kind of data that does not necessarily have a numerical meaning. Included is a second generation part that generates a second generalization hierarchy set that satisfies a predetermined property with respect to a generalization target data set and a generalization hierarchy set (in which the generalization hierarchy set contains a generalization hierarchy including any of the generalization target data included in the generalization target data set as at least one element), and provided that M is the maximum value of the length of the generalization hierarchies included in the generalization hierarchy set, D is a predetermined integer equal to or greater than 1 and less than or equal to M, and D' is a predetermined integer equal to or greater than D and less than or equal to M.

3 Claims, 14 Drawing Sheets

(56) References Cited

U.S. PATENT DOCUMENTS

| | | | | |
|---|---|---|---|---|
| 2013/0081099 A1* | 3/2013 | Sathish | ............... | G06F 21/6245 |
| | | | | 726/1 |
| 2014/0351946 A1* | 11/2014 | Oikawa | ............... | G06F 21/6254 |
| | | | | 726/26 |
| 2016/0267227 A1* | 9/2016 | Takeyama | ............... | G16Z 99/00 |
| 2017/0124336 A1* | 5/2017 | Freudiger | ............... | G06F 16/22 |
| 2020/0167313 A1* | 5/2020 | Isoda | .................... | G06F 16/144 |

OTHER PUBLICATIONS

Sweeney, "Achieving k-Anonymity Privacy Protection Using Generalization and Suppression", International Journal of Uncertainty, Fuzziness and Knowledge-Based Systems, vol. 10, Issue 5, May 2002, pp. 571-588.

Harada et al., "k-Anonymization Schemes with Automatic Generation of Generalization Trees and Distortion Measuring using Information Entropy", Information Processing Society of Japan, IPSJ SIG Technical Report, vol. 2010-CES-50, No. 47, 2010, pp. 1-7 (14 pages including English Translation).

Lefevre et al., "Mondrian Multidimensional K-Anonymity", in 22nd International Conference on Data Engineering (ICDE'06), 2006, pp. 1-11.

\* cited by examiner

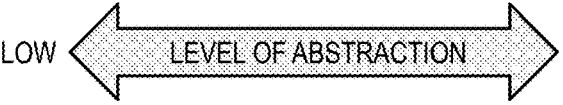

FIG. 3

| | | | | | |
|---|---|---|---|---|---|
| NULL | NULL | FRUIT | FOOD | FOOD & DRINK | *(ANY) |
| FUJI | APPLE | FRUIT | FOOD | FOOD & DRINK | *(ANY) |
| SHINANO GOLD | APPLE | FRUIT | FOOD | FOOD & DRINK | *(ANY) |
| NULL | ORANGE | AKUTAGAWA RYUNOSUKE | NOVEL | BOOK | *(ANY) |
| NULL | A BUNCH OF GRAPES | GRAPE | CHILDREN'S STORY | BOOK | *(ANY) |
| UNSHU ORANGE | ORANGE | FRUIT | FOOD | FOOD & DRINK | *(ANY) |
| NULL | RAIN BOOTS | BOOTS | FOOTWEAR | CLOTHING | *(ANY) |
| KYOHO | GRAPE | FRUIT | FOOD | FOOD & DRINK | *(ANY) |
| NULL | NULL | APPLE | MANUFACTURER | MACHINERY | *(ANY) |

| |
|---|
| APPLE |
| ORANGE |
| GRAPE |
| FRUIT |
| APPLE |

FIG. 4

| APPLE | FRUIT | FOOD | FOOD & DRINK | *(ANY) |
| ORANGE | FRUIT | FOOD | FOOD & DRINK | *(ANY) |
| GRAPE | FRUIT | FOOD | FOOD & DRINK | *(ANY) |

FIG. 5

| EXTRACTION ALGORITHM |
|---|
| Input: a, X, M |
| Output: C |
| 1: Remove generalization hierarchies in X that do not include element of a, treat result as Y. |
| 2: C=E(1, Y, [ ], a, M) |
| 3: return C |

FIG. 6

| FUNCTION E |
|---|
| Input: j, ~$C_p$, C, a, M |
| Output: C |
| 1: if j>M-1 then |
| 2:   return C |
| 3: end if |
| 4: U=uniq(~$C_p^{(:,j)}$) |
| 5: for u∈U do |
| 6:   Z=[ ] |
| 7:   for k∈list(u, ~$C_p^{(:,j)}$) do |
| 8:     for c∈~$C_p^{(k,:)}$ do |
| 9:       Z.add(c) |
| 10:     end for |
| 11:   end for |
| 12:   if all elements of a are included in Z then |
| 13:     ~$C_u$=[ ] |
| 14:     for k∈list(u, ~$C_p^{(:,j)}$) do |
| 15:       ~$C_u$.add(~$C_p^{(k,:)}$) |
| 16:     end for |
| 17:     C=E(j+1, ~$C_u$, C, a, M) |
| 18:   else |
| 19:     if not(C∈~$C_p$) then |
| 20:       C.add(~$C_p$) |
| 21:     end if |
| 22:   end if |
| 23: end for |
| 24: return C |

FIG. 7

| FORMATTING ALGORITHM |
|---|
| Input: a, C, M |
| Output: S |
| 1: for $\tilde{C}_p \in C$ do |
| 2:    $\tilde{S}=[\,]$ |
| 3:    Set $O_{\tilde{C}\_p}$ to number of generalization hierarchies included in $\tilde{C}_p$. |
| 4:    for $0 \leq i < O_{\tilde{C}\_p}$ do |
| 5:      T = [ ] |
| 6:      for $0 \leq j < M$ do |
| 7:        s=" " |
| 8:        if $\tilde{C}_p^{(i,j)} \in a$ then |
| 9:          for $0 \leq k \leq j$ do |
| 10:            if k=0 do |
| 11:              $s=\tilde{C}_p^{(i,j)}$ |
| 12:            else |
| 13:              $s=s+","+\tilde{C}_p^{(i,j)}$ |
| 14:            end if |
| 15:          end for |
| 16:        end if |
| 17:        T.add(s) |
| 18:      end for |
| 19:      for $s \in T$: |
| 20:        if $s \neq$ " " and not($s \in \tilde{S}$) then |
| 21:          $\tilde{S}$.add(s) |
| 22:        end if |
| 23:      end for |
| 24:    end for |
| 25:    For different $s_1$ and $s_2$ in $\tilde{S}$, check if $s_1 \in s_2$ or $s_2 \in s_1$; if $s_1 \in s_2$, remove $s_1$ from $\tilde{S}$, if $s_2 \in s_1$, remove $s_2$ from $\tilde{S}$. |
| 26:    S.add($\tilde{S}$) |
| 27: end for |
| 28: return S |

FIG. 8

| 5 | 4 | 3 | 2 | 1 | 0 |
|---|---|---|---|---|---|
| NULL | NULL | FRUIT | FOOD | FOOD & DRINK | *(ANY) |
| FUJI | APPLE | FRUIT | FOOD | FOOD & DRINK | *(ANY) |
| SHINANO GOLD | APPLE | FRUIT | FOOD | FOOD & DRINK | *(ANY) |
| NULL | ORANGE | AKUTAGAWA RYUNOSUKE | NOVEL | BOOK | *(ANY) |
| NULL | A BUNCH OF GRAPES | GRAPE | CHILDREN'S STORY | BOOK | *(ANY) |
| UNSHU MIKAN | ORANGE | FRUIT | FOOD | FOOD & DRINK | *(ANY) |
| NULL | RAIN BOOTS | BOOTS | FOOTWEAR | CLOTHING | *(ANY) ← REMOVE |
| KYOHO | GRAPE | FRUIT | FOOD | FOOD & DRINK | *(ANY) |
| NULL | NULL | APPLE | MANUFACTURER | MACHINERY | *(ANY) |

FIG. 9

| 5 | 4 | 3 | 2 | 1 | 0 |
|---|---|---|---|---|---|
| NULL | NULL | FRUIT | FOOD | FOOD & DRINK | *(ANY) |
| FUJI | APPLE | FRUIT | FOOD | FOOD & DRINK | *(ANY) |
| SHINANO GOLD | APPLE | FRUIT | FOOD | FOOD & DRINK | *(ANY) |
| UNSHU MIKAN | ORANGE | FRUIT | FOOD | FOOD & DRINK | *(ANY) |
| KYOHO | GRAPE | FRUIT | FOOD | FOOD & DRINK | *(ANY) |

FIG. 10

| | 5 | 4 | 3 | 2 | 1 | 0 |
|---|---|---|---|---|---|---|
| | NULL | NULL | FRUIT | FOOD | FOOD & DRINK | *(ANY) |
| | FUJI | APPLE | FRUIT | FOOD | FOOD & DRINK | *(ANY) |
| | SHINANO GOLD | APPLE | FRUIT | FOOD | FOOD & DRINK | *(ANY) |
| | UNSHU MIKAN | ORANGE | FRUIT | FOOD | FOOD & DRINK | *(ANY) |
| | KYOHO | GRAPE | FRUIT | FOOD | FOOD & DRINK | *(ANY) |

FIG. 11

| | 5 | 4 | 3 | 2 | 1 | 0 |
|---|---|---|---|---|---|---|
| | NULL | NULL | FRUIT | FOOD | FOOD & DRINK | *(ANY) |
| | FUJI | APPLE | FRUIT | FOOD | FOOD & DRINK | *(ANY) |
| | SHINANO GOLD | APPLE | FRUIT | FOOD | FOOD & DRINK | *(ANY) |
| | UNSHU MIKAN | ORANGE | FRUIT | FOOD | FOOD & DRINK | *(ANY) |
| | KYOHO | GRAPE | FRUIT | FOOD | FOOD & DRINK | *(ANY) |

FIG. 12

| 5 | 4 | 3 | 2 | 1 | 0 |
|---|---|---|---|---|---|
| FUJI | APPLE | FRUIT | FOOD | FOOD & DRINK | *(ANY) |
| SHINANO GOLD | APPLE | FRUIT | FOOD | FOOD & DRINK | *(ANY) |

FIG. 13

| 5 | 4 | 3 | 2 | 1 | 0 |
|---|---|---|---|---|---|
| UNSHU MIKAN | ORANGE | FRUIT | FOOD | FOOD & DRINK | *(ANY) |

FIG. 14

| 5 | 4 | 3 | 2 | 1 | 0 |
|---|---|---|---|---|---|
| KYOHO | GRAPE | FRUIT | FOOD | FOOD & DRINK | *(ANY) |

FIG. 15

| 5 | 4 | 3 | 2 | 1 | 0 |
|---|---|---|---|---|---|
| NULL | ORANGE | AKUTAGAWA RYUNOSUKE | NOVEL | BOOK | *(ANY) |
| NULL | A BUNCH OF GRAPES | GRAPE | CHILDREN'S STORY | BOOK | *(ANY) |

FIG. 16

| | 5 | 4 | 3 | 2 | 1 | 0 | |
|---|---|---|---|---|---|---|---|
| | NULL | NULL | FRUIT | FOOD | FOOD & DRINK | *(ANY) | 0 |
| | FUJI | APPLE | FRUIT | FOOD | FOOD & DRINK | *(ANY) | 1 |
| | SHINANO GOLD | APPLE | FRUIT | FOOD | FOOD & DRINK | *(ANY) | 2 |
| | UNSHU MIKAN | ORANGE | FRUIT | FOOD | FOOD & DRINK | *(ANY) | 3 |
| | KYOHO | GRAPE | FRUIT | FOOD | FOOD & DRINK | *(ANY) | 4 |

FIG. 19

| | 4 | 3 | 2 | 1 | 0 | |
|---|---|---|---|---|---|---|
| | NULL | FRUIT | FOOD | FOOD & DRINK | *(ANY) | 0 |
| | APPLE | FRUIT | FOOD | FOOD & DRINK | *(ANY) | 1 |
| | APPLE | FRUIT | FOOD | FOOD & DRINK | *(ANY) | 2 |
| | ORANGE | FRUIT | FOOD | FOOD & DRINK | *(ANY) | 3 |
| | GRAPE | FRUIT | FOOD | FOOD & DRINK | *(ANY) | 4 |

FIG. 20

| APPLE | FRUIT | FOOD | FOOD & DRINK | *(ANY) |
| ORANGE | FRUIT | FOOD | FOOD & DRINK | *(ANY) |
| GRAPE | FRUIT | FOOD | FOOD & DRINK | *(ANY) |

FIG. 21

| |
|---|
| CISAPRIDE |
| ANTIMONY SODIUM TARTRATE |
| OZAGREL |
| CELIPROLOL |
| TAZANOLAST |
| COCAINE |
| POLYMYXIN B |
| MOFETIL |
| ZANAMIVIR |
| ECONAZOLE |
| ETOMIDOLINE |
| AZELASTINE |
| SURAMIN |
| CORTISONE |
| DOPAMINE |
| RELENZA |
| TOLFENAMIC ACID |
| NADOLOL |
| PEMETREXED |

FIG. 22

| | | | | |
|---|---|---|---|---|
| CORTISONE | DRUG USED FOR INFLAMMATION | CURATIVE MEDICINE | MEDICINE | *(ANY) |
| CISAPRIDE | DRUG USED FOR NERVOUS SYSTEM | CURATIVE MEDICINE | MEDICINE | *(ANY) |
| TAZANOLAST | DRUG USED FOR IMMUNE SYSTEM | CURATIVE MEDICINE | MEDICINE | *(ANY) |
| OZAGREL | DRUG USED FOR IMMUNE SYSTEM | CURATIVE MEDICINE | MEDICINE | *(ANY) |
| SURAMIN | DRUG USED FOR INFECTIOUS DISEASE | CURATIVE MEDICINE | MEDICINE | *(ANY) |
| DOPAMINE | DRUG USED FOR NERVOUS SYSTEM | CURATIVE MEDICINE | MEDICINE | *(ANY) |
| ANTIMONY SODIUM TARTRATE | DRUG USED FOR INFECTIOUS DISEASE | CURATIVE MEDICINE | MEDICINE | *(ANY) |
| NADOLOL | DRUG USED FOR NERVOUS SYSTEM | CURATIVE MEDICINE | MEDICINE | *(ANY) |
| PEMETREXED | DRUG USED FOR MALIGNANT TUMORS | CURATIVE MEDICINE | MEDICINE | *(ANY) |
| AZELASTINE | DRUG USED FOR IMMUNE SYSTEM | CURATIVE MEDICINE | MEDICINE | *(ANY) |
| TOLFENAMIC ACID | DRUG USED FOR INFLAMMATION | CURATIVE MEDICINE | MEDICINE | *(ANY) |
| MOFETIL | DRUG USED FOR IMMUNE SYSTEM | CURATIVE MEDICINE | MEDICINE | *(ANY) |
| ECONAZOLE | DRUG USED FOR INFECTIOUS DISEASE | CURATIVE MEDICINE | MEDICINE | *(ANY) |
| COCAINE | DRUG USED FOR NERVOUS SYSTEM | CURATIVE MEDICINE | MEDICINE | *(ANY) |
| CELIPROLOL | DRUG USED FOR NERVOUS SYSTEM | CURATIVE MEDICINE | MEDICINE | *(ANY) |
| ETOMIDOLINE | DRUG USED FOR NERVOUS SYSTEM | CURATIVE MEDICINE | MEDICINE | *(ANY) |
| RELENZA | DRUG USED FOR INFECTIOUS DISEASE | CURATIVE MEDICINE | MEDICINE | *(ANY) |
| POLYMYXIN B | DRUG USED FOR INFECTIOUS DISEASE | CURATIVE MEDICINE | MEDICINE | *(ANY) |

FIG. 23

GENERALIZATION HIERARCHY SET GENERATION APPARATUS, GENERALIZATION HIERARCHY SET GENERATION METHOD, AND PROGRAM

CROSS-REFERENCE TO RELATED APPLICATIONS

The present application is based on PCT filing PCT/JP2020/007983, filed Feb. 27, 2020, which claims priority to JP 2019-039313, filed Mar. 5, 2019, the entire contents of each are incorporated herein by reference.

TECHNICAL FIELD

The present invention relates to anonymization technology.

BACKGROUND ART

Generalization (also referred to as abstraction) is one technology for anonymizing personal data, that is, information about individual persons. With generalization technology, it is necessary to define a generalization hierarchy to achieve generalization. Here, a generalization hierarchy refers to a hierarchical structure of data that includes 0 or more layers of gradually abstracted intermediate data from the data with the lowest level of abstraction to the data with the highest level of abstraction. FIG. 1 illustrates an example of a generalization hierarchy set containing generalization hierarchies as elements. Each row in FIG. 1 respectively expresses a generalization hierarchy. For example, the first row indicates the generalization hierarchy "Apple→Fruit→Food→Food & Drink→*(ANY)". In this generalization hierarchy, "Apple" is the data with the lowest level of abstraction, and "Fruit" is the data with the next-lowest level of abstraction after "Apple". Note that "*(ANY)" represents data positioned at the most general level (data with the highest level of abstraction) among all of the data. Also, a set containing data to be generalized (hereinafter also simply referred to as the generalization target data) as elements is referred to as a generalization target data set. For example, {Apple, Orange, Tea, Boots} is a generalization target data set containing "Apple", "Orange", "Tea", and "Boots" as elements. By using the generalization hierarchy set in FIG. 1 to generalize the generalization target data set {Apple, Orange, Tea, Boots}, a group of generalized data "Food, Food, Drink, Footwear" is obtained, for example. Also, the number of items of data included in a generalization hierarchy is referred to as the length of the generalization hierarchy. For example, the length of the generalization hierarchy in the first row of FIG. 1 is 5.

In the related art, a method of creating a generalization hierarchy so as to reduce information loss, that is, the difference between the data before generalization and the data after generalization, has been proposed. Here, the generalization hierarchy is the one used in privacy protection technology such as k-anonymity described in Non-patent literature 1, for example. Also, a generalization hierarchy that reduces information loss, that is, the difference between the data before generalization and the data after generalization, refers to a generalization hierarchy in which the generalization hierarchy can be used to keep the meaning and properties of the data after generalization from being largely different from the data before generalization. Methods of creating a generalization hierarchy in the related art can be roughly categorized into "methods using frequency" (Non-patent literature 2) and "methods using frequency and numerical information" (Non-patent literature 2, Non-patent literature 3). Both types of methods create a generalization hierarchy by grouping and abstracting data in order of lowest frequency. For this reason, when used for privacy protection technology like in Non-patent literature 1, privacy can be protected while avoiding the generalization of a relatively large amount of the data, although the results depend on the data. Consequently, with regard to avoiding overgeneralization, there is an effect of reducing information loss.

PRIOR ART LITERATURE

Non-Patent Literature

Non-patent literature 1: Latanya Sweeney, "Achieving k-anonymity privacy protection using generalization and suppression", International Journal of Uncertainty, Fuzziness and Knowledge-Based Systems, Vol. 10, Issue 5, pp. 571-588, 2002.

Non-patent literature 2: Kunihiko Harada and Yoshinori Sato, "k-anonymization Schemes with Automatic Generation of Generalization Trees and Distortion Measuring using Information Entropy", Computer Security (CSEC) Technical Report, 2010-CSEC-50(47), pp. 1-7, 2010.

Non-patent literature 3: K. LeFevre, D. J. DeWitt, R. Ramakrishnan, "Mondrian Multidimensional K-Anonymity", In 22nd International Conference on Data Engineering (ICDE'06), pp. 25, 2006.

SUMMARY OF THE INVENTION

Problems to be Solved by the Invention

However, for data that does not have a numerical meaning, the methods of the related art cannot create a generalization hierarchy on the basis of information other than frequency, and may even cause enormous information loss depending on the data. The "methods using frequency and numerical information" are a generalization technology suited to sets of generalization target data having numerical meaning, such as age or height. However, the "methods using frequency and numerical information" cannot be applied to sets of generalization target data that cannot be expressed numerically, such as "Apple" and "Orange" in FIG. 1. Also, the "methods using frequency" can be applied to generalization target data sets that do not have numerical meaning, but because only frequency is used, there are concerns that a generalization hierarchy may be created through the grouping of data having conceptual meanings and properties that are largely different from each other. Consequently, generalization through a generalization hierarchy obtained by the "methods using frequency" may create unnatural generalizations in terms of conceptual meaning, depending on the data.

Note that it is also conceivable to create a generalization hierarchy on the basis of thesauruses (including conceptual classifications, taxonomies, ontologies, and the like) used in fields such as natural language processing, but since most thesauruses are defined only in conceptual (or lexical) parent-child relationships called is-a relationships, if one attempts to create a generalization hierarchy from a thesaurus by simply using is-a relationships, there is a possibility that a contradictory generalization hierarchy will be created. For example, the generalization hierarchy set in FIG. 3 can be created from the thesaurus in FIG. 2, but the shaded rows in FIG. 3 are generalization hierarchies that contain contradictions. In other words, creating a generalization hierarchy for data that does not have a numerical meaning from a thesaurus is not easy, either.

Accordingly, an object of the present invention is to provide a technology that generates a set of generalization hierarchies that reduces information loss when generalizing any kind of data that does not necessarily have a numerical meaning.

Means to Solve the Problems

One aspect of the present invention comprises: a first generation part that generates a first generalization hierarchy set that is a subset of a generalization hierarchy set from a generalization target data set containing generalization target data as elements and the generalization hierarchy set containing generalization hierarchies as elements (in which the generalization hierarchy set contains a generalization hierarchy including any of the generalization target data included in the generalization target data set as at least one element); and a second generation part that generates a second generalization hierarchy set from the generalization target data set and the first generalization hierarchy set, in which, provided that M is an integer equal to or greater than 1 that expresses a maximum value of a length of the generalization hierarchies included in the generalization hierarchy set, the first generalization hierarchy set satisfies a property such that any generalization hierarchy included in the first generalization hierarchy set includes at least one of the generalization target data included in the generalization target data set, for d that satisfies $0 \leq d \leq D-1$, where D is a predetermined integer equal to or greater than 1 and less than or equal to M, the first generalization hierarchy set satisfies a property such that data in a dth layer of generalization hierarchies included in the first generalization hierarchy set is the same data, and a set that contains data from a (D−1)th layer to an (M−1)th layer of the generalization hierarchies included in the first generalization hierarchy set as elements includes the generalization target data set, and provided that D' is a predetermined integer equal to or greater than D and less than or equal to M, the second generalization hierarchy set satisfies a property such that a length of generalization hierarchies included in the second generalization hierarchy set is D', and data in a (D'−1)th layer of the generalization hierarchies included in the second generalization hierarchy set is an element of the generalization target data set.

Effects of the Invention

According to the present invention, it is possible to generate a set of generalization hierarchies that reduces information loss when generalizing any kind of data that does not necessarily have a numerical meaning.

BRIEF DESCRIPTION OF DRAWINGS

FIG. 3 is a diagram illustrating an example of a generalization hierarchy set containing contradictory generalization hierarchies generated from the thesaurus in FIG. 2;

FIG. 4 is a diagram illustrating an example of the inputs of a generalization hierarchy set generation algorithm;

FIG. 5 is a diagram illustrating an example of the output of a generalization hierarchy set generation algorithm;

FIG. 6 is a diagram illustrating an example of an extraction algorithm;

FIG. 7 is a diagram illustrating an example of a function E;

FIG. 8 is a diagram illustrating an example of a formatting algorithm;

FIG. 9 is a diagram illustrating an example of data obtained through a process of executing the extraction algorithm;

FIG. 10 is a diagram illustrating an example of data obtained through a process of executing the extraction algorithm;

FIG. 11 is a diagram illustrating an example of data obtained through a process of executing the extraction algorithm;

FIG. 12 is a diagram illustrating an example of data obtained through a process of executing the extraction algorithm;

FIG. 13 is a diagram illustrating an example of data obtained through a process of executing the extraction algorithm;

FIG. 14 is a diagram illustrating an example of data obtained through a process of executing the extraction algorithm;

FIG. 15 is a diagram illustrating an example of data obtained through a process of executing the extraction algorithm;

FIG. 16 is a diagram illustrating an example of data obtained through a process of executing the extraction algorithm;

FIG. 19 is a diagram illustrating an example of the input of the formatting algorithm;

FIG. 20 is a diagram illustrating an example of data obtained through a process of executing the formatting algorithm;

FIG. 21 is a diagram illustrating an example of the output of the formatting algorithm;

FIG. 22 is a diagram illustrating a generalization target data set treated as the input in a test;

FIG. 23 is a diagram illustrating a generalization hierarchy set obtained as the output in the test;

DETAILED DESCRIPTION OF THE EMBODIMENT

Hereinafter, an embodiment of the present invention will be described in detail. Note that structural elements having the same function are denoted with the same signs, and duplicate description of such elements is omitted.

Before describing each embodiment, the notation system used in this specification will be explained.

A caret (^) denotes superscript. For example, $x^{y^z}$ indicates that $y^z$ is a superscript of x, and $x_{y^z}$ indicates that $y^z$ is a subscript of x. Also, an underscore (_) denotes subscript. For example, $x^{y_z}$ indicates that $y_z$ is a superscript of x, and $x_{y_z}$ indicates that $y_z$ is a subscript of x.

A superscript character "^" or "~" preceding a certain character x, like ^x or ~x, should be written directly above "x", but is denoted as ^x or ~x due to the typographic constraints of the specification.

TECHNICAL BACKGROUND

Definitions

Figure 1:
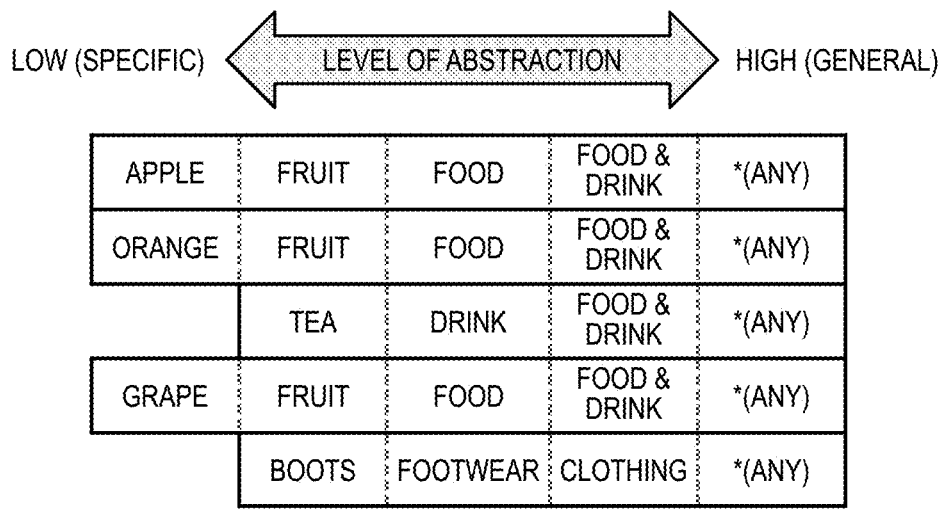
FIG. 1 is a diagram illustrating an example of a generalization hierarchy set.
Figure 2:
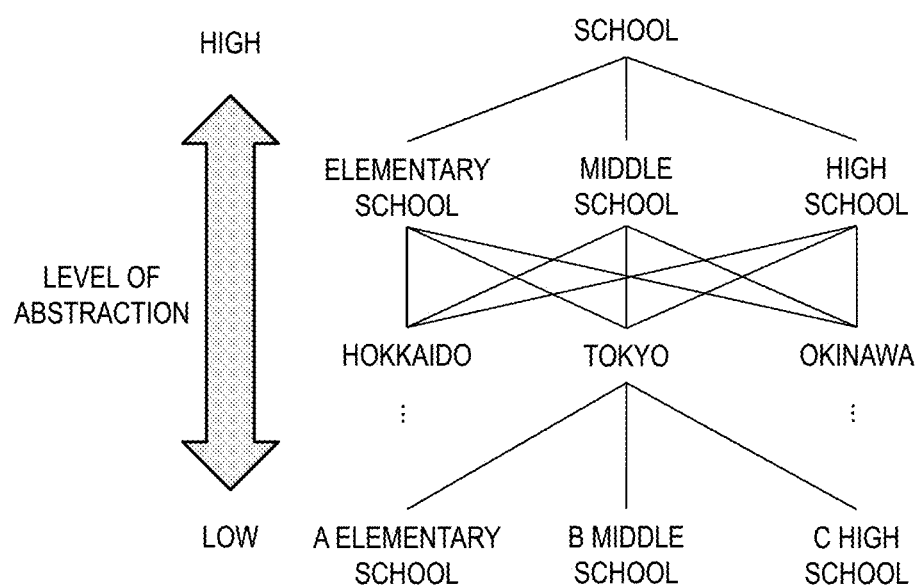
FIG. 2 is a diagram illustrating an example of a thesaurus.

First, several terms will be defined. Data to be generalized is referred to as generalization target data. Also, an arrangement of data in order of the lowest (or highest) level of abstraction is referred to as a generalization hierarchy. Also, the number of items of data included in a generalization hierarchy is referred to as the length of the generalization hierarchy. The maximum value of the length of the generalization hierarchy included in a generalization hierarchy set is referred to as the length of the generalization hierarchy set. In a generalization hierarchy, the position of the "*(ANY)" data at the most general level is referred to as the 0th layer, the position of the data at the next-most general level of abstraction is referred to as the 1st layer, and so on. Consequently, a generalization hierarchy of length M may be said to contain data from the 0th layer to the (M−1)th layer. For example, the length of the generalization hierarchy set in FIG. 1 is 5, and in the generalization hierarchy "Apple→Fruit→Food→Food & Drink→*(ANY)" in the first row, the data in the 2nd layer is "Food", and the data in the 4th layer is "Apple".

[Formulation of Problem]

Next, the problem will be formulated. Suppose that a generalization target data set containing generalization target data as elements and a generalization hierarchy set containing generalization hierarchies as elements (in which the generalization hierarchy set contains a generalization hierarchy including any of the generalization target data included in the generalization target data set as at least one element) are accepted as inputs, and a generalization hierarchy set that satisfies the following condition is generated and outputted. Note that the generalization target data included in the generalization target data set and the data forming the generalization hierarchies included in the generalization hierarchy set may or may not have numerical meaning.

(Condition) For any generalization target data included in the generalization target data set, reduce information loss, that is, the difference between the generalization target data and the data obtained by generalizing the generalization target data.

[Generalization Hierarchy Set Generation Algorithm]

Hereinafter, a generalization hierarchy set generation algorithm that solves the above problem will be described. The generalization hierarchy set generation algorithm includes an extraction algorithm and a formatting algorithm. Also, the extraction algorithm uses a function E. The extraction algorithm uses depth-first search (DFS) to generate a generalization hierarchy set containing many shared general concepts of the generalization target data, and the formatting algorithm generates a generalization hierarchy set obtained by formatting the generalization hierarchy set generated by the extraction algorithm into a format suitable for the generalization target data.

First, the notation used to describe the generalization hierarchy set generation algorithm will be described. Note that the indices of the arrays used in the generalization hierarchy set generation algorithm are all assumed to start from 0.

Provided that L is an integer equal to or greater than 1 that expresses the number of items of generalization target data contained in the generalization target data set and a is an array of the generalization target data, a is an L×1 array. Also, provided that M is an integer equal to or greater than 1 that expresses the length of the generalization hierarchy set, N is an integer equal to or greater than 1 that expresses the number of generalization hierarchies contained in the generalization hierarchy set, and X is an array of the generalization hierarchies, X is an N×M array. FIG. 4 illustrates a generalization target data set (array a of generalization target data) and a generalization hierarchy set (array X of generalization hierarchies) treated as the inputs of the generalization hierarchy set generation algorithm. The generalization hierarchies stored as rows of the array X are assumed to be stored such that lower index number denotes data with a higher level of abstraction and higher index number denotes data with a lower level of abstraction. For this reason, the data "*(ANY)" at the most general level is always stored in the 0th element of each row in the array X. Also, the data contained in a generalization hierarchy is assumed to be stored in order of lowest index number. Consequently, in the case where the length of a generalization hierarchy is shorter than M, "NULL" indicating that no data exists is stored in any leftover elements up to the index number M−1. For example, in the 0th row of the array X in FIG. 4, the length of the stored generalization hierarchy "Fruit→Food→Food & Drink→*(ANY)" is 4, and therefore "NULL" is stored in X(0, 4) and X(0, 5).

The extraction algorithm accepts the array a, the array X, and the length M as inputs, and outputs an array C of arrays of generalization hierarchies. Also, the formatting algorithm accepts the array a, the array C, and the length M as inputs, and outputs an array S of arrays of generalization hierarchies (character strings expressing generalization hierarchies). FIG. 5 is an illustration of the output of the generalization hierarchy set generation algorithm, namely the array S that is the output of the formatting algorithm.

Provided that A is a two-dimensional array, and i and j are index numbers of the rows and columns of the array A, the (i, j)th element of the array A is denoted $A^{(i,j)}$. Also, the ith row of the array A is denoted $A^{(i,:)}$ and the jth column of the array A is denoted $A^{(:,j)}$.

Provided that A is a two-dimensional array storing generalization hierarchies as rows (an array of generalization hierarchies), a function unig($A^{(:,j)}$) is a function that returns a set of elements obtained by removing duplicate elements and "NULL" elements from the jth column $A^{(:,j)}$ of the array A. Also, a function list(u, $A^{(:,j)}$) is a function that returns a set of the index numbers i for which the (i, j)th element $A^{(i,j)}$=u in the array A.

A function A.add(B) defined with respect to the array A is a function that adds an array B in the case where the array A is an array of arrays, and adds an element B in the case where the array A is an array of elements.

FIGS. 6 to 8 are diagrams illustrating the extraction algorithm, the function E, and the formatting algorithm, respectively. Note that in FIG. 8, $O_{\sim C_p}$ denotes the number of rows in an array $\sim C_p$, which is the pth element inside an array C.

The extraction algorithm in FIG. 6 accepts the array a, the array X, and the length M as inputs, and outputs the array C. FIG. 9 is a diagram illustrating the array X, and the shaded parts indicate elements of the array a. In step 1 of the extraction algorithm, the row marked "←REMOVE" in FIG. 9 is specified, the row is deleted, and an array Y is generated.

In step 2 of the extraction algorithm, the function E is called with j=1, ~$C_p$=Y, C=[ ], and M=M. Note that the function E is a function that extracts the set of generalization hierarchies satisfying the following two conditions from the given ~$C_p$, and outputs the result as the array C.

(Condition 1) The arrangement of concepts from the 0th column to the specified jth column is equal.

(Condition 2) All elements of the array a (that is, all generalization target data in the generalization target data set) are included.

In step 4 of the function E, when j=1, U={Food & Drink, Book, Machinery} and u=Food & Drink, and by extracting only the generalization hierarchies that contain "Food & Drink" as the data in the 1st layer, the generalization hierarchy set in FIG. 10 is generated. The generalization hierarchy set contains all elements of the generalization target data set and is therefore treated as ~$C_{Food\ \&\ Drink}$, and the function E is called in step 17.

Similarly to the above, in step 4 of the function E, when j=2, U={Food} and u=Food, and by extracting only the generalization hierarchies that contain "Food" as the data in the 2nd layer, the generalization hierarchy set in FIG. 11 is generated. The generalization hierarchy set contains all elements of the generalization target data set and is therefore treated as ~$C_{Food}$, and the function E is called in step 17.

Similarly to the above, in step 4 of the function E, when j=3, U={Fruit} and u=Fruit, and by extracting only the generalization hierarchies that contain "Fruit" as the data in the 3rd layer, the generalization hierarchy set in FIG. 12 is generated. The generalization hierarchy set contains all elements of the generalization target data set and is therefore treated as ~$C_{Fruit}$, and the function E is called in step 17.

Similarly to the above, in step 4 of the function E, when j=4, U={Apple, Orange, Grape} and u=Apple, and by extracting only the generalization hierarchies that contain "Apple" as the data in the 4th layer, the generalization hierarchy set in FIG. 13 is generated. The generalization hierarchy set does not contain all elements of the generalization target data set, and consequently ~$C_{Food\ \&\ Drink}$ is added to the array C corresponding to the output set (corresponds to step 20). Similarly, u=Orange is set, and by extracting only the generalization hierarchy that contains "Orange" as the data in the 4th layer, the generalization hierarchy set in FIG. 14 is generated. The generalization hierarchy set does not contain all elements of the generalization target data set, and consequently ~$C_{Food\ \&\ Drink}$ is added to the array C corresponding to the output set (corresponds to step 20). Also, u=Grape is set, and by extracting only the generalization hierarchy that contains "Grape" as the data in the 4th layer, the generalization hierarchy set in FIG. 15 is generated. The generalization hierarchy set does not contain all elements of the generalization target data set, and consequently ~$C_{Food\ \&\ Drink}$ is added to the array C corresponding to the output set (corresponds to step 20).

With the above, the process when j=1 and u=Food & Drink ends.

Next, j=1 and u=Book are set, and the process continues. Here, u=Book is set, and by extracting only the generalization hierarchies that contain "Book" as the data in the 1st layer, the generalization hierarchy set in FIG. 16 is generated. The generalization hierarchy set does not contain all elements of the generalization target data set, and consequently nothing is added to the array C corresponding to the output set.

Figures 17, 18:
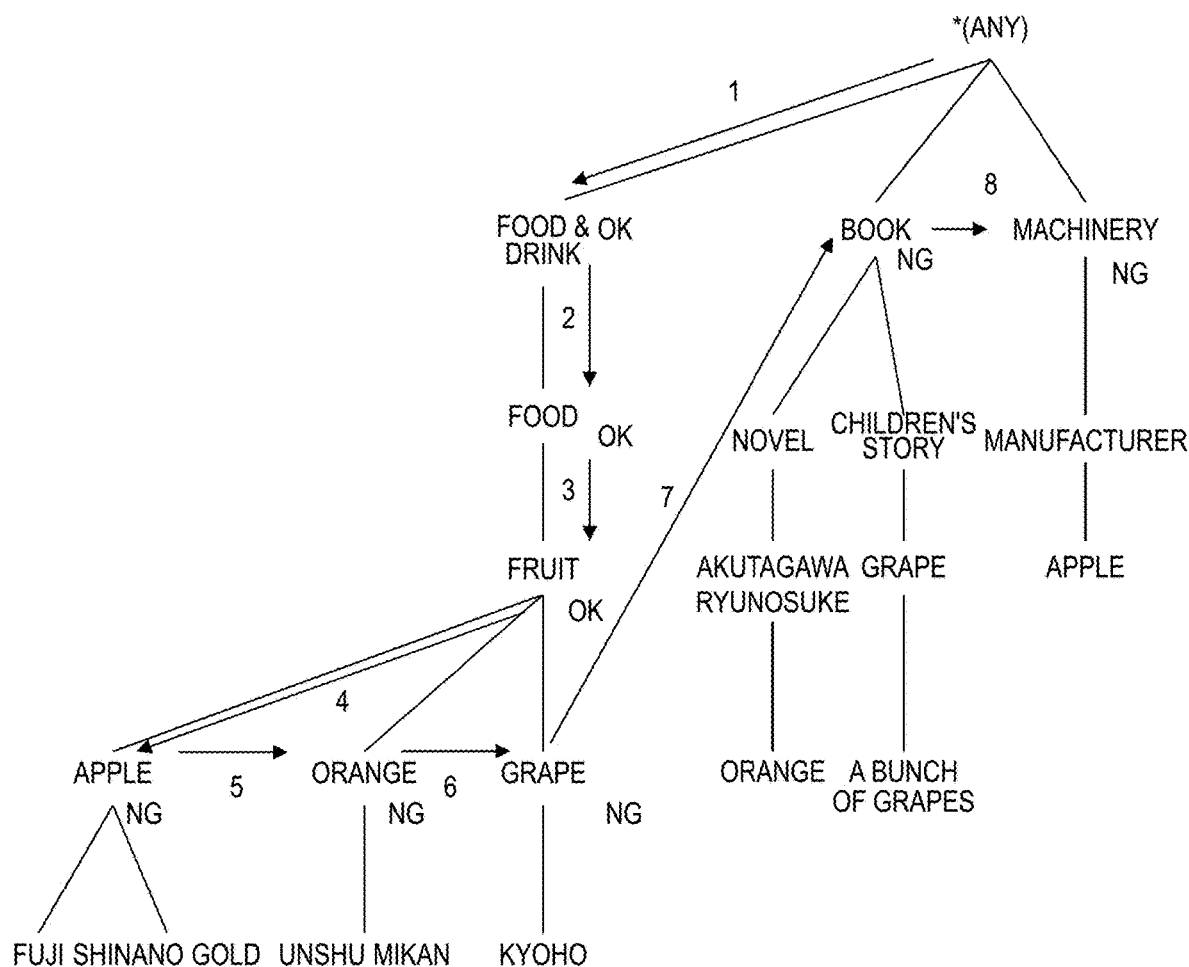
FIG. 17 is a diagram illustrating an example of data obtained through a process of executing the extraction algorithm.
FIG. 18 is a diagram illustrating an example of a search tree that illustrates how the extraction algorithm is executed.

Next, j=1 and u=Machinery are set, and the process continues. Here, u=Machinery is set, and by extracting only the generalization hierarchy that contains "Machinery" as the data in the 1st layer, the generalization hierarchy set in FIG. 17 is generated. The generalization hierarchy set does not contain all elements of the generalization target data set, and consequently nothing is added to the array C corresponding to the output set.

Through the above, the process of the extraction algorithm ends.

FIG. 18 uses a tree to represent a generalization hierarchy set, and is an illustration of how the extraction algorithm is executed. The numerals 1 to 8 indicate the search sequence. Also, OK and NG appearing beside the generalization hierarchy data treated as nodes indicate whether or not a deeper search is necessary.

The formatting algorithm in FIG. 8 accepts the array a, the array C, and the length M as inputs, and outputs the array S. In steps 5 to 18, character strings are used to execute subsequent processes, but arrays may be used instead of character strings to execute subsequent processes. Note that instead of a comma-delimited character string, a character string delimited by any character may also be used.

FIG. 19 is a diagram illustrating the input of the formatting algorithm (that is, the output of the extraction algorithm) The 5th column of the data in FIG. 19 is determined to be unnecessary for the generalization of the inputted generalization target data by steps 19 to 23 of the formatting algorithm, and is therefore removed. As a result, the data illustrated in FIG. 20 is obtained. The 0th row of the data in FIG. 20 is included in the 1st and 2nd rows, and is therefore determined to be unnecessary and is removed by step 25 of the formatting algorithm. Also, the 1st and 2nd rows of the data in FIG. 20 contain the same generalization hierarchy, and therefore one of the rows is determined to be unnecessary and is removed by step 25 of the formatting algorithm. As a result, the data illustrated in FIG. 21 is obtained as the output of the formatting algorithm.

Note that the array S that is the output of the generalization hierarchy set generation algorithm may be |S|>1 in some cases. In such cases, there are two or more elements in the array of generalization hierarchies, or in other words, two or more generalization hierarchy sets are outputted, but the decision about which generalization hierarchy set to use to generalize the generalization target data may be left up to the user.

[Test]

Wikipedia (Reference non-patent literature 1) was used to test the generalization hierarchy set generation algorithm. Here, a generalization hierarchy set that is one of the inputs into the generalization hierarchy set generation algorithm was collected and generated from Wikipedia. Specifically, generalization hierarchy sets were generated according to a method of recording the items listed on pages containing "list" in the page title on Wikipedia. As a result, a generalization hierarchy set containing approximately 250,000 generalization hierarchies was obtained. By treating a generalization target data set containing the drug data in FIG. 22 as the generalization target data and the above generalization hierarchy set as inputs and executing the generalization hierarchy set generation algorithm, the generalization hierarchy set in FIG. 23 was obtained as the output. (Reference non-patent literature 1: Wikipedia, "Welcome to Wikipedia" (in Japanese), [online], [retrieved Feb. 22, 2019], Internet <URL: http://ja.wikipedia.org/wiki/>.

Note that the generalization hierarchy set that is one of the inputs into the generalization hierarchy set generation algorithm may be generated using any kind of information insofar as a hierarchical structure of generalization target data can be created. For example, electronic health records, EC sites, recipe sites, and video sites on the Internet can be used. Also, a text corpus (see Reference non-patent literature 2, for example) usable as generalization hierarchy data of general concepts may be used for generation.

(Reference non-patent literature 2: National Institute for Japanese Language and Linguistics, Center for Corpus Development, "Word List by Semantic Principles—Revised and Expanded Database" (in Japanese), [online], [retrieved Feb. 22, 2019], Internet <URL: https://pj.ninjal.ac.jp/corpus_center/goihyo.html>.

First Embodiment

Figure 24:
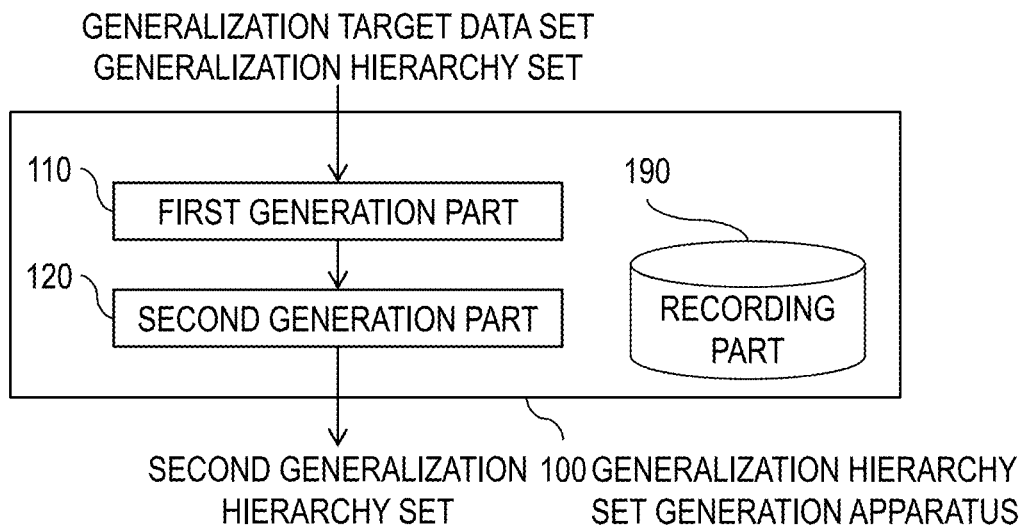
FIG. 24 is a block diagram illustrating an example of a configuration of a generalization hierarchy set generation apparatus 100.
Figure 25:
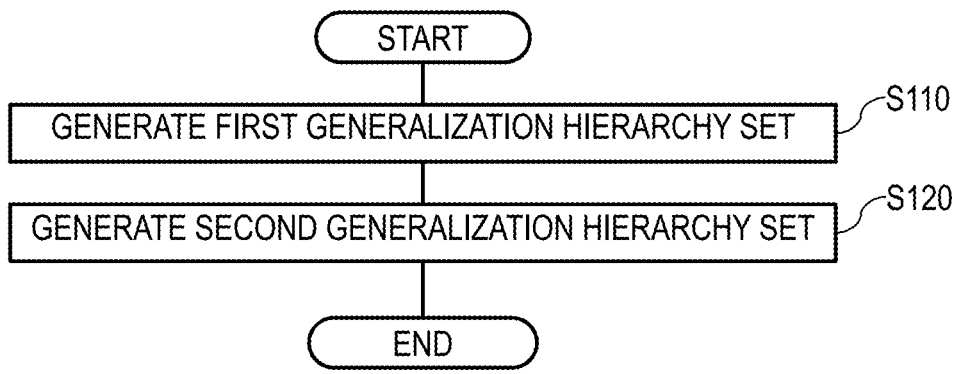
FIG. 25 is a flowchart illustrating an example of operations by the generalization hierarchy set generation apparatus 100.

Hereinafter, FIGS. 24 and 25 will be referenced to describe a generalization hierarchy set generation apparatus 100 that executes the generalization hierarchy set generation algorithm. FIG. 24 is a block diagram illustrating a configuration of the generalization hierarchy set generation apparatus 100. FIG. 25 is a flowchart illustrating operations by the generalization hierarchy set generation apparatus 100. As illustrated in FIG. 24, the generalization hierarchy set generation apparatus 100 includes a first generation part 110, a second generation part 120, and a recording part 190. The recording part 190 is a component that appropriately records information necessary for the process by the generalization hierarchy set generation apparatus 100. The recording part 190 records data that is used in the process by the generalization hierarchy set generation apparatus 100, such as the generalization target data set.

Operations by the generalization hierarchy set generation apparatus 100 will be described by following FIG. 25.

In S110, the first generation part 110 accepts a generalization target data set containing generalization target data as elements and a generalization hierarchy set containing generalization hierarchies as elements (in which the generalization hierarchy set contains a generalization hierarchy including any of the generalization target data included in the generalization target data set as at least one element) as inputs, generates a first generalization hierarchy set that is a subset of the generalization hierarchy set from the generalization target data set and the generalization hierarchy set, and outputs the first generalization hierarchy set. The first generation part 110 is a component that executes the extraction algorithm, and the first generalization hierarchy set is a set that satisfies the following two properties. Here, M is an integer equal to or greater than 1 that expresses the maximum value of the length of the generalization hierarchies included in the generalization hierarchy set.

(Property 1) Any generalization hierarchy included in the first generalization hierarchy set includes at least one of the generalization target data included in the generalization target data set.

(Property 2) For d that satisfies $0 \leq d \leq D-1$, where D is a predetermined integer equal to or greater than 1 and less than or equal to M, the data in the dth layer of the generalization hierarchies included in the first generalization hierarchy set is the same data, and a set that contains the data from the (D−1)th layer to the (M−1)th layer of the generalization hierarchies included in the first generalization hierarchy set as elements includes the generalization target data set.

(Property 1) is derived from step 1 of the extraction algorithm. Also, (Property 2) is derived from steps 12 to 17 of the function E.

In S120, the second generation part 120 accepts the generalization target data set and the first generalization hierarchy set generated in S110 as inputs, generates a second generalization hierarchy set from the generalization target data set and the first generalization hierarchy set, and outputs the second generalization hierarchy set. The second generation part 120 is a component that executes the formatting algorithm, and the second generalization hierarchy set is a set that satisfies the following property. (Property 3) Provided that D' is a predetermined integer equal to or greater than D and less than or equal to M, a length of generalization hierarchies included in the second generalization hierarchy set is D', and data in a (D'−1)th layer of the generalization hierarchies included in the second generalization hierarchy set is an element of the generalization target data set.

(Property 3) is derived from steps 6 to 23 and step 25 of the formatting algorithm.

According to the embodiment of the present invention, it is possible to generate a set of generalization hierarchies that reduces information loss when generalizing any kind of data that does not necessarily have a numerical meaning Through generalization, substituting in more general data (data with a high level of abstraction) leads to information loss, but in the embodiment of the present invention, by extracting a generalization hierarchy set containing many shared general concepts of the generalization target data, a generalization hierarchy with reduced information loss is generated.

APPENDIX

An apparatus of the present invention includes, as a single hardware entity for example, an input part connectible to a keyboard or the like, an output part connectible to a liquid crystal display or the like, a communication part connectible to a communication device (for example, a communication cable) capable of communicating externally to the hardware entity, a central processing unit (CPU, which may also be provided with cache memory, registers, and the like), memory such as RAM and ROM, an external storage device such as a hard disk, and a bus that interconnects the input part, output part, communication part, CPU, RAM, ROM, and external storage device so as to allow the exchange of data. Additionally, if necessary, the hardware entity may also be provided with a device (drive) capable of reading and writing to a recording medium such as CD-ROM or the like. A general-purpose computer is one example of a physical entity provided with such hardware resources.

Information such as programs necessary for achieving the functions described above and data necessary for the processing by the programs is stored in the external storage device of the hardware entity (but the information is not limited to be stored in the external storage device, and may also be stored in the ROM acting as a dedicated storage device for loading programs for example). In addition, information such as data obtained from the processing by the programs is stored appropriately in the RAM, the external storage device, and the like.

In the hardware entity, each program and the data necessary for the processing by each program stored in the external storage device (or the ROM or the like) are loaded into memory as necessary and interpretively executed/processed by the CPU appropriately. As a result, the CPU achieves predetermined functions (each of the components referred to as a part or means in the above).

The present invention is not limited to the embodiment described above, and appropriate modifications are possible within a scope that does not depart from the gist of the present invention. Also, the processes described in the above embodiment not only may be executed in a time series following the order described, but may also be executed in parallel or individually according to the processing capability of the device executing the process, or as needed.

As described above, in the case where the processing functions of the hardware entity in the above embodiment (the apparatus of the present invention) are achieved by a computer, the processing content of the functions that the hardware entity should have are stated by a program. Thereafter, by causing the computer to execute the program, the processing functions of the above hardware entity are achieved on the computer.

The program stating the processing content can be recorded to a computer-readable recording medium. The computer-readable recording medium may be any type of medium such as a magnetic recording device, an optical disc, a magneto-optical recording medium, or semiconductor memory, for example. Specifically, for example, a hard disk drive, a flexible disk, or magnetic tape may be used as the magnetic recording device, a DVD (Digital Versatile Disc), a DVD-RAM (Random Access Memory), a CD-ROM (Compact Disc Read Only Memory), or a CD-R (Recordable)/RW (ReWritable) may be used as the optical disc, an MO (Magneto-Optical disc) may be used as the magneto-optical recording medium, and an EEP-ROM (Electronically Erasable and Programmable-Read Only Memory) may be used as the semiconductor memory.

Also, the program is distributed by selling, transferring, or lending a portable recording medium such as a DVD or CD-ROM on which the program is recorded, for example. Furthermore, the program may also be stored in a storage device of a server computer and distributed by transferring the program from the server computer to another computer over a network.

The computer that executes such a program first stores the program recorded on the portable recording medium or the program transferred from the server computer in its own storage device, for example. Thereafter, when executing processes, the computer loads the program stored in its own storage device, and executes processes according to the loaded program. Also, as a different mode of executing the program, the computer may be configured to load the program directly from the portable recording medium and execute processes according to the program, and furthermore, the computer may be configured to execute processes according to the received program in succession every time the program is transferred to the computer from the server computer. Also, a configuration for executing the processes described above may also be achieved by what is called an ASP (Application Service Provider) type service, in which processing functions are achieved by an execution instruction and a result acquisition only, without transferring the program from the server computer to the computer. Note that the program in this mode is assumed to include accompanying information conforming to the program for processing by an electronic computer (such as data that is not direct instructions to the computer, but has properties that stipulate processing by the computer).

Also, in this mode, the hardware entity is configured by causing the predetermined program to be executed on the computer, but at least a portion of the processing content may also be achieved with hardware.

The above description of the embodiment of the invention is presented for the purpose of illustration and description. There is no intention to be exhaustive, nor is there any intention to limit the invention to the exact form disclosed. Modifications and variations are possible from the teaching described above. The embodiment has been selected and expressed to provide the best illustration of the principles of the invention and to enable those skilled in the art to utilize the invention in various embodiments and with various modifications applied to suit their contemplated and actual use. All such modifications and variations are within the scope of the invention as set forth by the appended claims, construed according to the breadth fairly and legally given.

What is claimed is:

1. A generalization hierarchy set generation apparatus, comprising:
    at least one memory storing computer executable instructions; and
    at least one processor configured to execute the computer executable instructions to:
        generate a first generalization hierarchy set, that is a subset of a generalization hierarchy set, from a generalization target data set containing generalization target data as elements and the generalization hierarchy set containing generalization hierarchies as elements, wherein the generalization hierarchy set contains at least one generalization hierarchy that, for any of the generalization target data included in the generalization target data set, includes the generalization target data; and
        generate a second generalization hierarchy set from the generalization target data set and the first generalization hierarchy set, wherein
    generation of the second generalization hierarchy set from the generalization hierarchy set, which contains all elements of the generalization target data set, reduces information loss,
    provided that M is an integer equal to or greater than 1 that expresses a maximum value of a length of the generalization hierarchies included in the generalization hierarchy set, the first generalization hierarchy set satisfies a property such that any generalization hierarchy included in the first generalization hierarchy set includes at least one of the generalization target data included in the generalization target data set,
    for d that satisfies $0 \leq d \leq D-1$, where D is a predetermined integer equal to or greater than 1 and less than or equal to M, the first generalization hierarchy set satisfies a property such that data in a dth layer of generalization hierarchies included in the first generalization hierarchy set is the same data, and a set that contains data from a (D−1)th layer to an (M−1)th layer of the generalization hierarchies included in the first generalization hierarchy set as elements includes the generalization target data set, and
    provided that D' is a predetermined integer equal to or greater than D and less than or equal to M, the second generalization hierarchy set satisfies a property such that a length of generalization hierarchies included in the second generalization hierarchy set is D', and data in a (D'−1)th layer of the generalization hierarchies included in the second generalization hierarchy set is an element of the generalization target data set.

2. A generalization hierarchy set generation method, comprising:
    first generating a first generalization hierarchy set, that is a subset of a generalization hierarchy set, from a generalization target data set containing generalization target data as elements and the generalization hierarchy set containing generalization hierarchies as elements, wherein the generalization hierarchy set contains at least one generalization hierarchy that, for any of the generalization target data included in the generalization target data set, includes the generalization target data; and second generating a second generalization hierarchy set from the generalization target data set and the first generalization hierarchy set, wherein the second generating the second generalization hierarchy set from the generalization hierarchy set, which contains all elements of the generalization target data set, reduces information loss, provided that M is an integer equal to or greater than 1 that expresses a maximum value of a length of the generalization hierarchies included in the generalization hierarchy set, the first generalization hierarchy set satisfies a property such that any generalization hierarchy included in the first generalization hierarchy set includes at least one of the generalization target data included in the generalization target data set, for d that satisfies $0 \leq d \leq D-1$, where D is a predetermined integer equal to or greater than 1 and less than or equal to M, the first generalization hierarchy set satisfies a property such that data in a dth layer of generalization hierarchies included in the first generalization hierarchy set is the same data, and a set that contains data from a (D−1)th layer to an (M−1)th layer of the generalization hierarchies included in the first generalization hierarchy set as elements includes the generalization target data set, and provided that D' is a predetermined integer equal to or greater than D and less than or equal to M, the second generalization hierarchy set satisfies a property such that a length of generalization hierarchies included in the second generalization hierarchy set is D', and data in a (D'−1)th layer of the generalization hierarchies included in the second generalization hierarchy set is an element of the generalization target data set.

3. A non-transitory computer-readable storage medium which stores computer executable instructions which, when executed by a processor of a computer, cause the computer to;

generate a first generalization hierarchy set, that is a subset of a generalization hierarchy set, from a generalization target data set containing generalization target data as elements and the generalization hierarchy set containing generalization hierarchies as elements, wherein the generalization hierarchy set contains at least one generalization hierarchy that, for any of the generalization target data included in the generalization target data set, includes the generalization target data; and generate a second generalization hierarchy set from the generalization target data set and the first generalization hierarchy set, wherein generation of the second generalization hierarchy set from the generalization hierarchy set, which contains all elements of the generalization target data set, reduces information loss, provided that M is an integer equal to or greater than 1 that expresses a maximum value of a length of the generalization hierarchies included in the generalization hierarchy set, the first generalization hierarchy set satisfies a property such that any generalization hierarchy included in the first generalization hierarchy set includes at least one of the generalization target data included in the generalization target data set, for d that satisfies $0 \leq d \leq D-1$, where D is a predetermined integer equal to or greater than 1 and less than or equal to M, the first generalization hierarchy set satisfies a property such that data in a dth layer of generalization hierarchies included in the first generalization hierarchy set is the same data, and a set that contains data from a (D−1)th layer to an (M−1)th layer of the generalization hierarchies included in the first generalization hierarchy set as elements includes the generalization target data set, and provided that D' is a predetermined integer equal to or greater than D and less than or equal to M, the second generalization hierarchy set satisfies a property such that a length of generalization hierarchies included in the second generalization hierarchy set is D', and data in a (D'−1)th layer of the generalization hierarchies included in the second generalization hierarchy set is an element of the generalization target data set.

* * * * *